(12) United States Patent
Gordon (10) Patent No.: US 11,987,196 B2
(45) Date of Patent: May 21, 2024

(54) ROLL CAGE CENTER SUPPORTS

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 143 days.

(21) Appl. No.: 17/105,062

(22) Filed: Nov. 25, 2020

(65) Prior Publication Data

US 2021/0155190 A1 May 27, 2021

Related U.S. Application Data

(60) Provisional application No. 62/940,821, filed on Nov. 26, 2019.

(51) Int. Cl.
*B60R 21/13* (2006.01)
*B60R 21/00* (2006.01)

(52) U.S. Cl.
CPC ...... *B60R 21/13* (2013.01); *B60R 2021/0018* (2013.01)

(58) Field of Classification Search
CPC .................. B60R 21/13; B60R 2021/0018
See application file for complete search history.

(56) References Cited

U.S. PATENT DOCUMENTS

| | | | | |
|---|---|---|---|---|
| 10,843,743 B2* | 11/2020 | St-Pierre | ............. | B62D 23/005 |
| 10,967,825 B2* | 4/2021 | Hisamura | ............. | B62D 27/065 |
| 11,028,883 B2* | 6/2021 | Olason | ................... | B60K 17/35 |
| 11,345,406 B2* | 5/2022 | Johnson | ............... | B62D 21/183 |
| 2011/0298189 A1* | 12/2011 | Schneider | ............ | B62D 23/005 |
| | | | | 296/64 |
| 2013/0256050 A1* | 10/2013 | Novotny | ............. | B62D 23/005 |
| | | | | 180/312 |
| 2014/0353956 A1* | 12/2014 | Bjerketvedt | ............. | B60N 2/24 |
| | | | | 296/64 |
| 2018/0065465 A1* | 3/2018 | Ward | ....................... | B62D 5/04 |
| 2018/0147966 A1* | 5/2018 | Reed | ...................... | B60J 5/0487 |
| 2020/0346542 A1* | 11/2020 | Rasa | .................... | B62D 23/005 |
| 2020/0361273 A1* | 11/2020 | Borud | .................... | B60K 11/02 |
| 2021/0129921 A1* | 5/2021 | Rasa | ....................... | B60R 21/13 |
| 2021/0155190 A1* | 5/2021 | Gordon | .................. | B60R 21/13 |
| 2021/0155191 A1* | 5/2021 | Gordon | .................. | B62D 23/00 |

* cited by examiner

*Primary Examiner* — Toan C To
(74) *Attorney, Agent, or Firm* — Barry Choobin; Patent 360

(57) ABSTRACT

An apparatus and methods are provided for a chassis for an off-road vehicle that includes roll cage center supports. The chassis is a welded-tube variety of chassis that includes a front portion and a rear portion that are joined to an intervening passenger cabin portion. The roll cage center supports include angled braces for counteracting lateral forces on a canopy of the vehicle during a rollover event. A center roof bar disposed along a midline of the canopy provides overhead protection to occupants within the passenger cabin portion. Windshield braces within a windshield area of the canopy reinforce a front of the center roof bar. A rear of the center roof bar is reinforced by roof braces within a rear of the canopy. The windshield braces and the roof braces support the center roof bar so as to withstand forces exerted on the canopy during a rollover event.

16 Claims, 4 Drawing Sheets

ROLL CAGE CENTER SUPPORTS

PRIORITY

This application claims the benefit of and priority to U.S. Provisional Application, entitled "Roll Cage Center Supports," filed on Nov. 26, 2019 and having application Ser. No. 62/940,821, the entirety of said application being incorporated herein by reference.

FIELD

Embodiments of the present disclosure generally relate to the field of vehicle chassis systems. More specifically, embodiments of the disclosure relate to an apparatus and methods for an off-road vehicle chassis comprising roll cage center supports configured to improve the strength of the chassis and provide enhanced safety to occupants within the vehicle.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A chassis comprising a structural arrangement of welded tubes typically is configured to support components of the off-road vehicle. For example, a front portion of the chassis is configured to support a front suspension of the off-road vehicle and various components of the off-road vehicle, such as a steering gear, a front differential, and the like. A rear portion of the chassis is configured to support a rear suspension of the off-road vehicle, such as rear trailing arms, as well as support various drivetrain components, such as a transaxle, a rear differential, an engine, and the like. Further, a roll cage or canopy comprising a welded tube structure coupled to the chassis is configured to protect the driver and passengers in the event of a rollover situation.

Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles.

SUMMARY

An apparatus and methods are provided for a chassis for an off-road vehicle that includes roll cage center supports. The chassis is a welded-tube variety of chassis that includes a front portion and a rear portion that are joined to an intervening passenger cabin portion. The roll cage center supports include angled braces for counteracting lateral forces on a canopy of the vehicle during a rollover event. A center roof bar disposed along a midline of the canopy provides overhead protection to occupants within the passenger cabin portion. Windshield braces within a windshield area of the canopy reinforce a front of the center roof bar. A rear of the center roof bar is reinforced by roof braces within a rear of the canopy. The windshield braces and the roof braces support the center roof bar so as to withstand forces exerted on the canopy during a rollover event.

In an exemplary embodiment, a roll cage center support comprising a chassis of a vehicle comprises: a center roof bar disposed along a midline of a canopy of the vehicle; windshield braces for reinforcing a front of the center roof bar; and roof braces for reinforcing a rear of the center roof bar.

In another exemplary embodiment, the windshield braces extend from a windshield crossmember at a top of a windshield area of the canopy to a dash bar comprising a passenger cabin portion of the vehicle. In another exemplary embodiment, the windshield braces are joined to a location of the windshield crossmember that is joined by the center roof bar. In another exemplary embodiment, the center roof bar extends rearward to a midpoint of a roof crossmember comprising a rear of the canopy. In another exemplary embodiment, the windshield braces extend at an angle with respect to one another from the windshield crossmember to the dash bar. In another exemplary embodiment, the angle is configured to reinforce the front of the center roof bar to withstand forces exerted on the canopy during a rollover event.

In another exemplary embodiment, the center roof bar is joined to a windshield crossmember at a top of a windshield area of the canopy and extends rearward to a roof crossmember comprising a rear of the canopy. In another exemplary embodiment, the center roof bar is configured to withstand forces exerted on top of the canopy during a rollover event. In another exemplary embodiment, the center roof bar is configured to provide overhead protection to occupants within a passenger cabin portion of the vehicle. In another exemplary embodiment, the windshield braces and the roof braces are configured to reinforce the center roof bar respectively by way of the windshield crossmember and the roof crossmember. In another exemplary embodiment, the roof braces are joined to a location of a roof crossmember that is directly rearward of the center roof bar and extend to opposite sides of a rear of the canopy. In another exemplary embodiment, the roof braces extend at an angle with respect to one another from the roof crossmember to rear braces comprising the rear of the canopy. In another exemplary embodiment, the angle is configured to reinforce the rear of the center roof bar to withstand forces exerted on the canopy during a rollover event.

In an exemplary embodiment, a method for a roll cage center support comprising a chassis of a vehicle comprises: extending a center roof bar along a midline of a canopy of the vehicle; joining a front of the center roof bar to a midpoint of a windshield crossmember comprising a windshield are of the canopy; and joining a rear of the center roof bar to a midpoint of a roof crossmember comprising a rear of the canopy.

In another exemplary embodiment, the method further comprises extending windshield braces from the windshield crossmember to a dash bar comprising a passenger cabin portion of the vehicle. In another exemplary embodiment, extending the windshield braces includes joining the windshield braces to the midpoint of the windshield crossmember. In another exemplary embodiment, extending the windshield braces includes disposing an angle between the windshield braces to reinforce the front of the center roof bar. In another exemplary embodiment, the method further comprises extending roof braces from the roof crossmember to rear braces disposed on opposite sides of the rear of the canopy. In another exemplary embodiment, extending the roof braces includes joining the roof braces to the midpoint of the roof crossmember. In another exemplary embodiment, extending the roof braces includes disposing an angle between the roof braces to reinforce the rear of the center roof bar.

These and other features of the concepts provided herein may be better understood with reference to the drawings, description, and appended claims.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first tube," may be made. However, the specific numeric reference should not be interpreted as a literal sequential order but rather interpreted that the "first tube" is different than a "second tube." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles. Embodiments disclosed herein provide an apparatus and methods for an off-road vehicle chassis comprising roll cage center supports configured to improve the strength of the chassis and safety of occupants within the vehicle.

Figure 1:
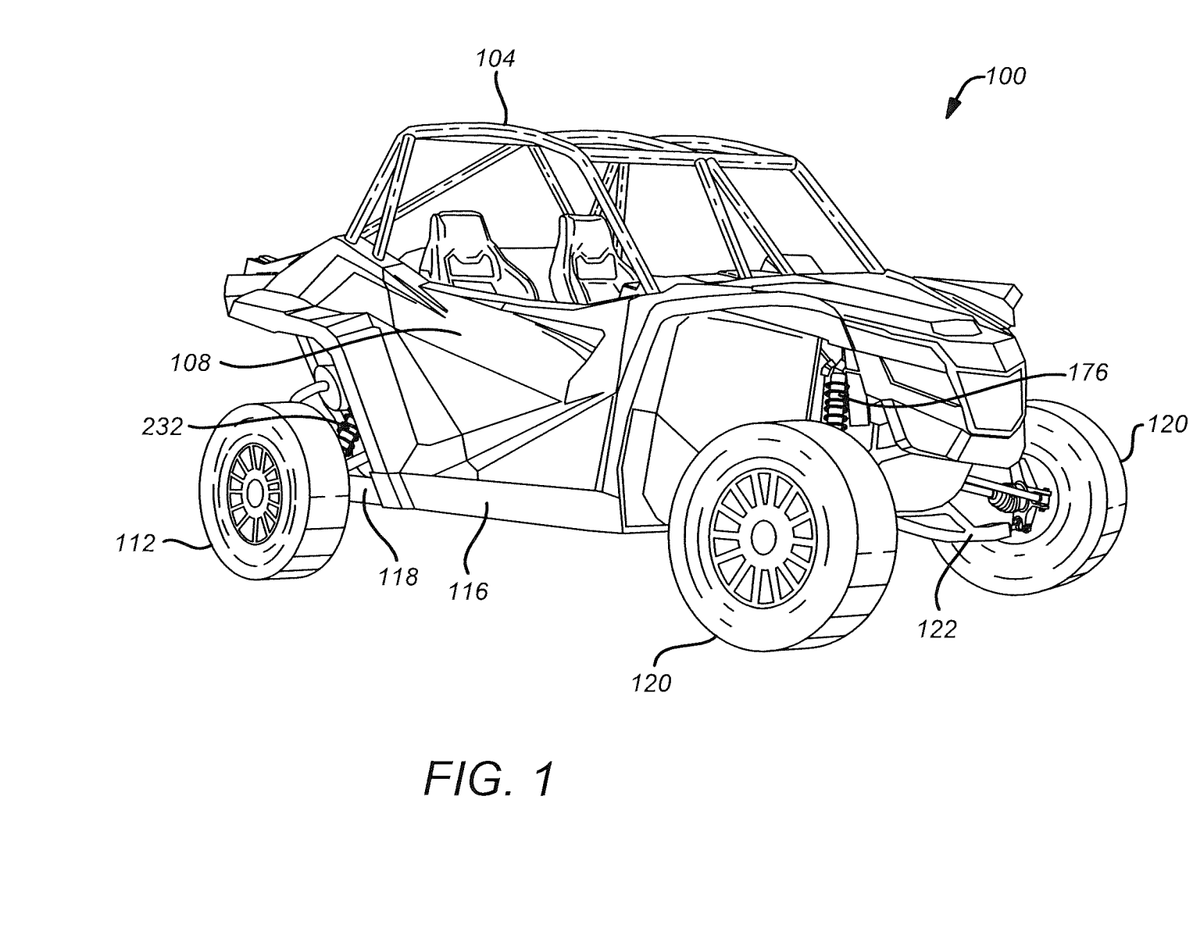
FIG. 1 illustrates an exemplary embodiment of an off-road vehicle that is suitable for implementation of roll cage center supports in accordance with the present disclosure.

FIG. 1 shows an off-road vehicle 100 that is particularly suitable for implementation of roll cage center supports in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system 118. Front wheels 120 may be operably coupled with the chassis 116 by way of a front suspension system 122 and a spindle assembly. It should be understood, however, that the roll cage center supports disclosed herein is not to be limited to the specific off-road vehicle 100 shown in FIG. 1, but rather the roll cage center supports may be incorporated into a wide variety of vehicles, other than the off-road vehicle 100 of FIG. 1, without limitation.

Figure 2:
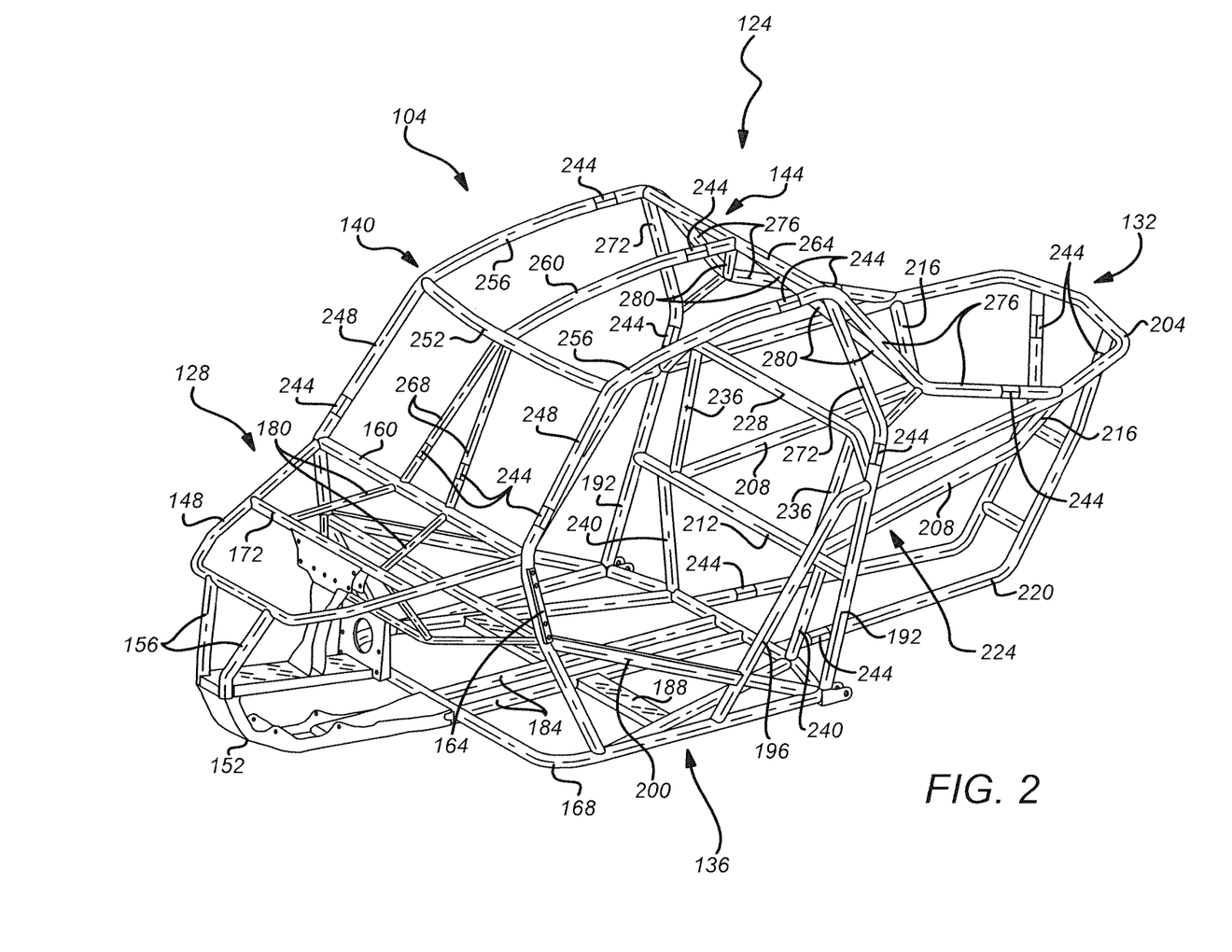
FIG. 2 illustrates an isometric view of an exemplary embodiment of vehicle chassis that includes roll cage center supports according to the present disclosure.

FIG. 2 illustrates an isometric view of an exemplary embodiment of vehicle chassis 124 that includes roll cage center supports and is suitable for implementation in the off-road vehicle 100 of FIG. 1. The chassis 124 generally is a welded-tube variety of chassis that includes a front portion 128 and a rear portion 132 that are joined to an intervening passenger cabin portion 136. A front canopy 140 and a rear canopy 144 are configured to impart structural integrity to the chassis 124 and to provide overhead protection to occupants of the off-road vehicle 100, as described herein.

The front portion 128 generally is configured to support various components comprising the off-road vehicle 100, such as, by way of non-limiting example, a front suspension 122, a steering gear, a front differential, and the like. The front portion 128 may be defined by a front hoop 148 at a top of the front portion 128 and a front skid plate 152 at a bottom of the front portion 128. Frontward stays 156 attach the front hoop 148 to the front skid plate 152. As will be appreciated, the frontward stays 156 operate similarly to a front bulkhead of the chassis 124. Opposite of the frontward stays 156, the front hoop 148 is joined to opposite ends of a dash bar 160 and hinge pillars 164 comprising the passenger cabin portion 136. Further, a rear of the front skid plate 152 is fastened to a floor hoop 168 comprising the passenger cabin portion 136.

With continuing reference to FIG. 2, a front strut crossmember 172 is attached at opposite ends between the driver-side and passenger-side of the front hoop 148. The front strut crossmember 172 provides a means for coupling front struts 176 to the chassis 124, see for example FIG. 1. As shown in FIG. 2, front strut braces 180 are disposed between the front strut crossmember 172 and the dash bar 160. The front strut braces 180 are configured to reinforce the front strut crossmember 172, such that loading on the front strut crossmember 172 by the front struts 176 is distributed to the dash bar 160. As such, forces on the front strut crossmember 172 by the front struts 176, during operation of the vehicle 100, are shared by the dash bar 160.

With continuing reference to FIG. 2, the floor hoop 168 generally defines a floor of the passenger cabin portion 136. Longitudinal floor bars 184 and crossmembers 188 coupled with the floor hoop 168 impart structural strength to the passenger cabin portion 136 and facilitate coupling various components to the floor of the passenger cabin portion 136. The hinge pillars 164 join the front portion 128 with the floor hoop 168, and thus define a front of the passenger cabin portion 136. Rear pillars 192 are coupled with a rear of the passenger cabin portion 136 and join the passenger cabin portion 136 with the rear portion 132 of the chassis 124. A rear side brace 196 is disposed between each rear pillar 192 and the floor hoop 168. Similarly, a front side brace 200 is disposed between the floor hoop 168 and each hinge pillar 164. It is contemplated that the side braces 196, 200 generally comprise side X-bars that impart structural integrity to the chassis 124 and thus resist bowing of the passenger cabin portion 136 due to loading on the front and rear portions 128, 132 during operation of the vehicle 100.

The rear portion 132 generally is configured to support a rear suspension 118 of the off-road vehicle, such as rear trailing arms, as well as support various drivetrain components, shown in FIG. 1, such as a transaxle, a rear differential, an engine, and the like. A rear hoop 204 is joined at opposite ends to rear pillars 192 and defines an upper extent of the rear portion 132. Below the rear hoop 204 are lower rear stays 208 that are coupled with the rear pillars 192 by way of a seat crossmember 212. Braces 216 couple the lower rear stays 208 to the rear hoop 204. The rear hoop 204, the lower rear stays 208 and the braces 216 comprise a structure suitable for mounting drivetrain components, such as a transaxle, a rear differential, an engine, and the like. A rear skid plate 220 is disposed at a bottom of the rear portion 132 and coupled between the passenger cabin portion 136 and a rear-most portion of the rear hoop 132. The rear skid plate 220 serves to provide protection to an underside of the drivetrain components during operation of the vehicle 100. As such, the rear hoop 204, the lower rear stays 208 and the rear skid plate 220 generally define an engine bay 224 of the vehicle 100.

As shown in FIG. 2, a rear strut crossmember 228 is disposed between the rear pillars 192 and joined with the ends of the rear hoop 204. The rear strut crossmember 228 is configured to provide a means for coupling rear struts 232 to the chassis 124, as shown in FIG. 1. As shown in FIG. 2, vertical braces 236 are disposed between the rear strut crossmember 228 and the seat crossmember 212. The vertical braces 236 are configured to reinforce the rear strut crossmember 228, such that loading on the rear strut crossmember 228 by the rear struts 232 is distributed to the seat crossmember 212. As such, forces on the rear strut crossmember 228 by the rear struts 232, during operation of the vehicle 100, are shared by the seat crossmember 212. Further, lower braces 240 disposed between the seat crossmember 212 and the floor hoop 168 cause the passenger cabin portion 136 to contribute to distributing loading forces throughout the chassis 124.

As will be appreciated, the passenger cabin portion 136, as well as the front portion 128 and the rear portion 132, are configured to distribute loading forces during operation of the vehicle 100 so as to resist damage to components comprising the vehicle and to protect occupants riding within the vehicle 100. To this end, the canopy 104 is configured to contribute to the structural integrity of the chassis 124. The canopy 104 comprises a front canopy 140 and rear canopy 144 that are configured to be coupled with the chassis 124. In particular, the front canopy 140 is configured to be coupled with the front portion 128, and the rear canopy 144 is configured to be coupled with the rear portion 132.

Moreover, the front canopy 140 is configured to be coupled with the rear canopy 144. The front and rear canopies 140, 144 are respectively fastened to the front and rear portions 128, 132 by way of multiple fasteners 244. In general, each fastener 244 comprises a tube-shaped member having a diameter that is substantially similar to the diameter of the frame portions to be coupled together.

It should be recognized that the front canopy 140 and the rear canopy 144 provide an overhead assembly that contributes to the overall integrity of the entire chassis 124. As such, the front canopy 140 and the rear canopy 144 provide an overhead spine to the chassis 124 that greatly increases the strength of the chassis 124 and thus the safety of occupants of the vehicle 100 relative to conventional chassis configurations. The front and rear canopies 140, 144 are discussed in greater detail in the following paragraphs.

The front canopy 140 includes an A-pillar 248 that is coupled with each hinge pillar 164 by way of a suitably sized fastener 244. The A-pillars 248 extend upward to a windshield crossmember 252. As such, the A-pillars 248 and the windshield crossmember 252 generally define a windshield area of the vehicle 100. Each A-pillar 248 joins with a roof bar 256 that extends rearward to the rear canopy 144. In some embodiments, the A-pillar 248 and the roof bar 256 comprise separate tube-pieces that are fastened or joined together, such as by welding. In some embodiments, however, the A-pillar 248 and the roof bar 256 comprise a single tube-piece that is suitably bent or manipulated to form the A-pillar 248 and the roof bar 256 as shown in FIG. 2. The roof bars 256 are each fastened to the rear canopy 144 by way of a suitably sized fastener 244.

With continuing reference to the front canopy 140 of FIG. 2, a center roof bar 260 is disposed substantially midway between the roof bars 256 and extends from the windshield crossmember 252 rearward to a roof crossmember 264 that comprises the rear canopy 144. Forward of the center roof bar 260, windshield braces 268 extend toward the dash bar 160. Each windshield brace 268 is joined with the dash bar 160 by way of a suitably sized fastener 244. Further, the windshield braces 268 are joined to locations of the dash bar 160 that coincide with the front strut braces 180. It is contemplated that loading forces due to the front struts 176, shown in FIG. 1, are distributed along the front strut braces 180, the windshield braces 268, and the center roof bar 260 to the rear canopy 144. It should be understood, therefore, that the front strut braces 180, the windshield braces 268, the center roof bar 260 and the rear canopy 144 comprise an overhead spine that serves to reinforce the structural integrity of the chassis 124.

Figure 3:
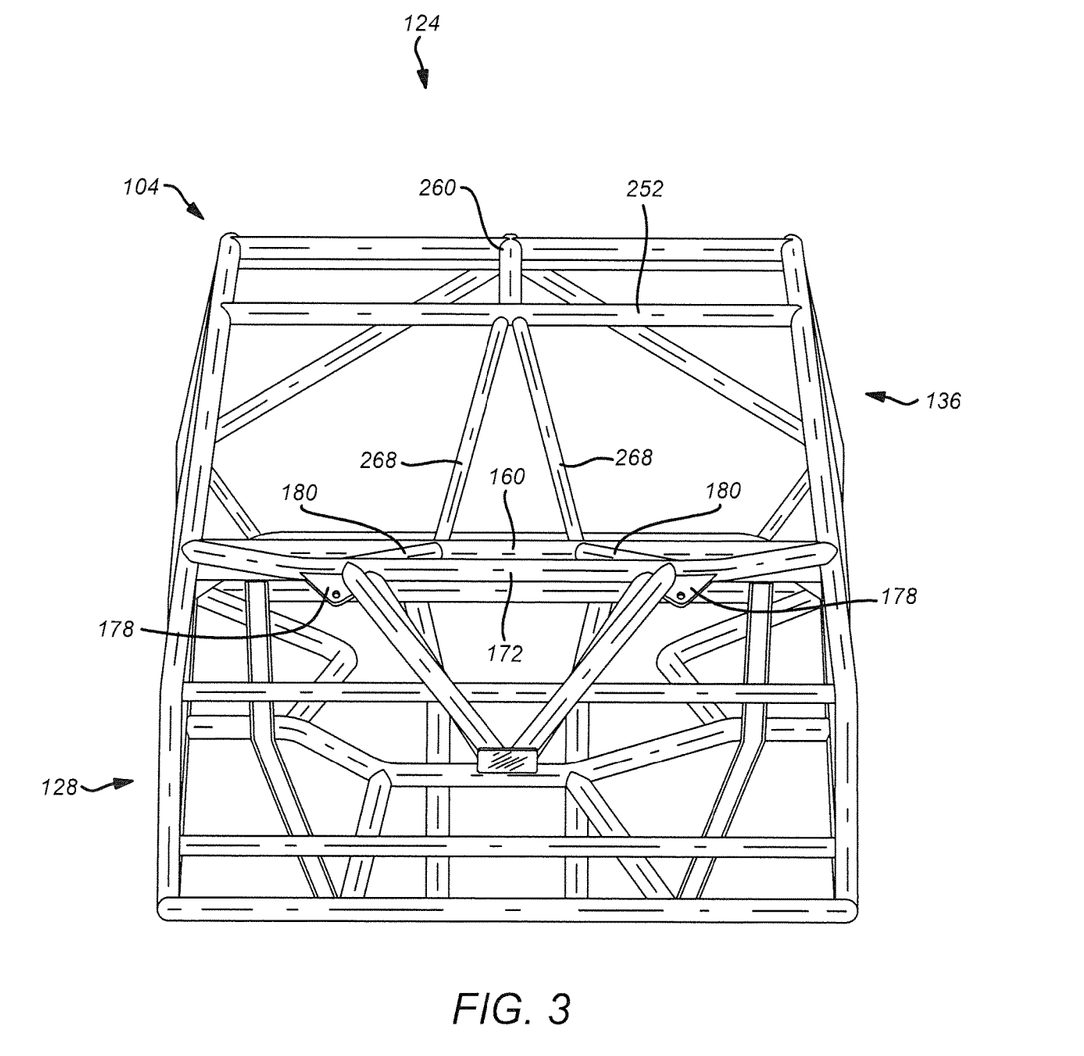
FIG. 3 illustrates a front view of an exemplary embodiment of vehicle chassis that includes chassis strut supports and is suitable for implementation in an off-road vehicle.

FIG. 3 illustrates a front view of an exemplary embodiment of vehicle chassis 124 that includes chassis strut supports and is suitable for implementation in an off-road vehicle, in accordance with the present disclosure. As shown in FIG. 3, the chassis 124 includes front strut braces 180 and windshield braces 268 that are joined to a dash bar 160 comprising the chassis 124. The front strut braces 180 generally extend from a front chassis portion 128 to a passenger cabin portion 136 comprising the chassis 124. The front strut braces 180 are configured to cooperate with the passenger cabin portion 136 to distribute loading forces during operation of the off-road vehicle so as to resist damage to components comprising the vehicle and to protect occupants riding within the vehicle. As shown in FIG. 3, one end of each front strut brace 180 is coupled to a location of a front strut crossmember 172 that is above a top mount 178 of a front strut 176 (see FIG. 1). An opposite end of each front strut brace 180 is coupled to a location of the dash bar 160 that is joined by the windshield brace 268 comprising a canopy 104. As described herein, the canopy 104 extends over the passenger cabin portion 136 and is configured to contribute to the structural integrity of the chassis 124. As shown in FIG. 3, the windshield braces 268 extend from the dash bar 160 to a windshield crossmember 252 that is reinforced by way of a center roof bar 260 comprising the canopy 104. The center roof bar 260 is configured to withstand forces exerted on top of the canopy 104 during a rollover event, and thus provides overhead protection to occupants within the passenger cabin portion 136 of the vehicle 100. It should be understood, therefore, that all of the front strut crossmember 172, the front strut braces 180, the dash bar 160, the windshield braces 268, the windshield crossmember 252, and the center roof bar 260 operate to provide a chassis that exhibits relatively greater structural integrity than conventional chassis configurations.

As shown in FIG. 2, the center roof bar 260 and both roof bars 256 are each fastened to the roof crossmember 264 by way of suitably sized fasteners 244. The roof crossmember 264 is disposed between B-pillars 272 that are fastened to the rear pillars 192 comprising the passenger cabin portion 136 by way of fasteners 244. A rear brace 276 extends rearward of each B-pillar 272 from the roof crossmember 264 to the rear hoop 204. A suitably sized fastener 244 couples each rear brace 276 to the rear hoop 204. As such, the roof bars 256 are reinforced by the passenger cabin portion 136 by way of the rear pillars 192 and the B-pillars 272, as well as the rear portion 132 by way of the rear braces 276. Further, the center roof bar 260 is reinforced by roof braces 280 extending from the roof crossmember 264 to the rear braces 276. To this end, the roof braces 280 are joined with the roof crossmember 264 at a location directly rearward of the center roof bar 260. Thus, forces acting on the center roof bar 260 are distributed to the rear braces 276 by way of the roof crossmember 264 and the roof braces 280.

Figure 4:
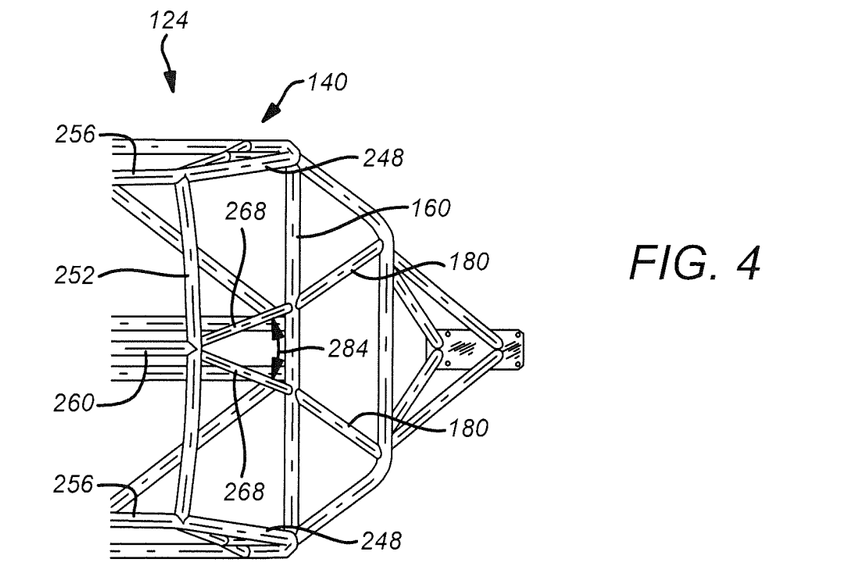
FIG. 4 illustrates a top view of a roll cage center support comprising an exemplary embodiment of a front canopy that comprises a chassis of an off-road vehicle.

FIG. 4 illustrates a top view of an exemplary embodiment of a front canopy 140 that comprises a chassis 124 of an off-road vehicle 100. As discussed hereinabove, the front canopy 140 includes an A-pillar 248 disposed along a driver-side and a passenger-side of the windshield area. The A-pillars 248 extend upward to a windshield crossmember 252. Each A-pillar 248 joins with a roof bar 256 that extends rearward to the rear canopy 144. As shown in FIG. 4, a center roof bar 260 is disposed substantially midway between the roof bars 256 and extends from the windshield crossmember 252 rearward to a roof crossmember 264 comprising the rear canopy 144. Forward of the center roof bar 260, windshield braces 268 extend through the windshield area toward the dash bar 160. As discussed herein, the windshield braces 268 are joined to locations of the dash bar 160 that coincide with the front strut braces 180, such that the windshield braces 268 participate in distributing loading forces due to the front struts 176 (see FIG. 1) to the rear canopy 144.

Moreover, as shown in FIG. 4, the windshield braces 268 spread apart from one another at an angle 284 as they extend through the windshield area to the dash bar 160. The angle 284 between the windshield braces 268 positions the windshield braces 268 at an angle with respect to the A-pillars 248, as well. Experimental observation has demonstrated that the windshield braces 268 disposed at the angle 284 provides a roll cage center support to the front canopy 140 that operates to support the center roof bar 260 and reinforce the front canopy 140 from collapsing during a rollover event. In particular, the windshield braces 268 disposed at the angle 284 effectively counteracts lateral forces that may be exerted on the front canopy 140, thereby preventing the A-pillars 248 from being folded over and injuring occupants within the passenger cabin portion 136 of the vehicle 100. In the illustrated embodiment of FIGS. 3-4, the angle 284 between the windshield braces 268 is dictated by the locations along the dash bar 160 that are joined by the front strut braces 180. In some embodiments, however, the windshield braces 268 may be disposed at any of various suitable angles 284 with respect to one another, without limitation. Further, the angle 284 may be configured to reinforce the front of the center roof bar 260 so as to withstand forces exerted on the canopy 104 during a rollover of the vehicle 100.

Figure 5:
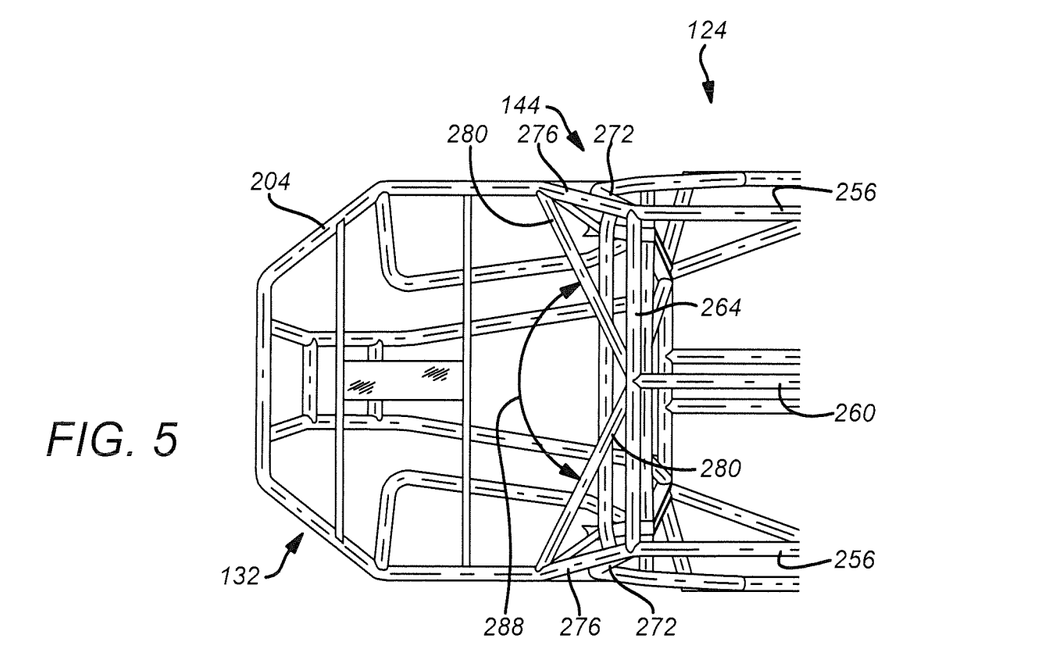
FIG. 5 illustrates a top view of a roll cage center support comprising an exemplary embodiment of a rear canopy that comprises a chassis of an off-road vehicle.

FIG. 5 illustrates a top view of an exemplary embodiment of a rear canopy 144 that comprises a chassis 124 of an off-road vehicle 100. In general, the front canopy 140 and the rear canopy 144 provide an overhead assembly that contributes to the overall integrity of the entire chassis 124 and thus optimizes the safety of occupants within the vehicle 100. As shown in FIG. 5, the center roof bar 260 extends rearward from the windshield crossmember 252 (see FIG. 2) of the front canopy 140 to a roof crossmember 264 comprising the rear canopy 144. Further, roof bars 256 comprising the front canopy 140 are joined to the roof crossmember 264 comprising the rear canopy 144. The roof crossmember 264 is disposed between B-pillars 272 that are fastened to the rear pillars 192 (see FIG. 2) of the passenger cabin portion 136. A rear brace 276 extends rearward of each B-pillar 272 from the roof crossmember 264 to the rear hoop 204. As such, the roof bars 256 are reinforced by the B-pillars 272 and the rear pillars 192 of the passenger cabin portion 136, as well as by way of the rear braces 276. As further shown in FIG. 5, the center roof bar 260 is reinforced by roof braces 280 extending from the roof crossmember 264 to the rear braces 276. To this end, the roof braces 280 are joined with the roof crossmember 264 at a location directly rearward of the center roof bar 260. Thus, forces acting on the center roof bar 260 are distributed to the rear braces 276 by way of the roof crossmember 264 and the roof braces 280.

With continuing reference to FIG. 5, the roof braces 280 spread apart from one another at an angle 288 as they extend to the rear braces 276 on opposite sides of the rear portion 132. Similar to the windshield braces 268 discussed above, experimental observation has shown that the roof braces 280 disposed at the angle 288 provide a roll cage center support that supports the center roof bar 260 and reinforces the rear canopy 144 against collapsing during a rollover event. As will be appreciated, the angle 288 between the roof braces 280 effectively counteracts lateral forces that may be exerted on the rear canopy 144, thereby preventing the B-pillars 272 from folding over and injuring occupants within the vehicle

100 during rolling over. Further, the angle 288 may be configured to reinforce the rear of the center roof bar 260 so as to withstand forces exerted on the canopy 104 during a rollover of the vehicle 100. It is contemplated that the roof braces 280 may be disposed at any of various suitable angles 288 that are found to optimize the structural integrity of the rear canopy 144, without limitation.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A roll cage center support comprising a chassis of a vehicle, the center support comprising:
   a center roof bar disposed along a midline of a canopy of the vehicle;
   windshield braces for reinforcing a front of the center roof bar, the windshield braces being disposed at an angle with respect to one another, the angle being configured to reinforce the front of the center roof bar to withstand forces exerted on the canopy during a rollover event;
   front strut braces configured to support the windshield braces, each of the front strut brace is coupled to a location of a front strut crossmember that is above a top mount of a front strut;
   roof braces for reinforcing a rear of the center roof bar, the roof braces disposed at an angle with respect to one another, the angle being configured to reinforce the rear of the center roof bar to withstand forces exerted on the canopy during the rollover event;
   rear braces and braces further coupled to the respective roof braces; a front hoop that extends forward from a dash bar, the front hoop has a proximal end and a distal end;
   a platform spatially positioned below and forward to the front hoop, the platform is of an elongated rectangular profile having a front end portion and a rear end portion;
   a front forward stay of a V-shape profile, the front forward stay extends between the proximal end of the front hoop, the distal end of the front hoop, and the front end portion of the platform; and
   a rear forward stay of a V-shape profile, the rear forward stay extends between the proximal end of the front hoop, the distal end of the front hoop, and the rear end portion of the platform,
   wherein the front end portion and the rear end portion of the platform are along an x-axis, the proximal end and the distal end of the front hoop are along a y-axis, the x-axis is perpendicular to the y-axis.

2. The center support of claim 1, wherein the windshield braces extend from a windshield crossmember at a top of a windshield area of the canopy to the dash bar comprising a passenger cabin portion of the vehicle.

3. The center support of claim 2, wherein the windshield braces are joined to a location of the windshield crossmember that is joined by the center roof bar.

4. The center support of claim 3, wherein the center roof bar extends rearward to a midpoint of a roof crossmember comprising a rear of the canopy.

5. The center support of claim 3, wherein the windshield braces extend at the angle with respect to one another from the windshield crossmember to the dash bar.

6. The center support of claim 1, wherein the center roof bar is joined to a windshield crossmember at a top of a windshield area of the canopy and extends rearward to a roof crossmember comprising a rear of the canopy.

7. The center support of claim 6, wherein the center roof bar is configured to withstand forces exerted on top of the canopy during a rollover event.

8. The center support of claim 6, wherein the center roof bar is configured to provide overhead protection to occupants within a passenger cabin portion of the vehicle.

9. The center support of claim 6, wherein the windshield braces and the roof braces are configured to reinforce the center roof bar respectively by way of the windshield crossmember and the roof crossmember.

10. The center support of claim 1, wherein the roof braces are joined to a location of a roof crossmember that is directly rearward of the center roof bar and extend to opposite sides of a rear of the canopy.

11. The center support of claim 10, wherein the roof braces extend at the angle with respect to one another from the roof crossmember to rear braces comprising the rear of the canopy.

12. A method for a roll cage center support comprising a chassis of a vehicle, the method comprising:
   extending a center roof bar along a midline of a canopy of the vehicle;
   joining a front of the center roof bar to a midpoint of a windshield crossmember comprising a windshield are of the canopy;
   disposing an angle between windshield braces to reinforce the front of the center roof bar;
   joining front strut braces to the respective windshield braces to further reinforce the same, wherein each of the front strut brace is coupled to a location of a front strut crossmember that is above a top mount of a front strut;
   joining a rear of the center roof bar to a midpoint of a roof crossmember comprising a rear of the canopy;
   disposing an angle between roof braces to reinforce the rear of the center roof bar;
   joining rear braces and braces to the respective roof braces; extending a front hoop forward from a dash bar, the front hoop has a proximal end and a distal end;
   positioning a platform spatially below and forward to the front hoop, the platform is of an elongated rectangular profile having a front end portion and a rear end portion;
   a front forward stay of a V-shape profile, the front forward stay extending between the proximal end of the front hoop, the distal end of the front hoop, and the front end portion of the platform; and
   a rear forward stay of a V-shape profile, the rear forward stay extending between the proximal end of the front hoop, the distal end of the front hoop, and the rear end portion of the platform, wherein the front end portion and the rear end portion of the platform are along an x-axis, the proximal end and the distal end of the front hoop are along a y-axis, the x-axis is perpendicular to the y-axis.

13. The method of claim 12, further comprising extending the windshield braces from the windshield crossmember to the dash bar comprising a passenger cabin portion of the vehicle.

14. The method of claim 13, wherein extending the windshield braces includes joining the windshield braces to the midpoint of the windshield crossmember.

15. The method of claim 12, further comprising extending the roof braces from the roof crossmember to rear braces disposed on opposite sides of the rear of the canopy.

16. The method of claim 15, wherein extending the roof braces includes joining the roof braces to the midpoint of the roof crossmember.

* * * * *